United States Patent [19]

Nishi

[11] Patent Number: 5,046,899
[45] Date of Patent: Sep. 10, 1991

[54] CUTTING INSERT

[75] Inventor: Masami Nishi, Kyoto, Japan

[73] Assignee: Kyocera Corporation, Kyoto, Japan

[21] Appl. No.: 653,987

[22] Filed: Feb. 11, 1991

Related U.S. Application Data

[63] Continuation of Ser. No. 262,601, Oct. 26, 1988, abandoned.

[30] Foreign Application Priority Data

Oct. 30, 1987 [JP] Japan ................................ 62-276492

[51] Int. Cl.⁵ ...................... B23B 27/08; B23B 27/16; B23B 2722
[52] U.S. Cl. ....................................... 407/102; 407/113
[58] Field of Search ............... 407/102, 103, 113, 114, 407/115, 120

[56] References Cited

U.S. PATENT DOCUMENTS

| | | | |
|---|---|---|---|
| 3,792,514 | 2/1974 | Ushijima | 407/113 |
| 3,815,192 | 6/1974 | Ohtsu | 407/114 |
| 4,214,845 | 7/1980 | Mori | 407/114 |
| 4,304,509 | 12/1981 | Mori | 407/114 |
| 4,487,534 | 12/1984 | Reiter | 407/114 |
| 4,832,541 | 5/1989 | Noguchi et al. | 407/114 |
| 4,850,255 | 7/1989 | Pruvot et al. | 407/101 |

Primary Examiner—William E. Terrell
Attorney, Agent, or Firm—Spensley Horn Jubas & Lubitz

[57] ABSTRACT

A cutting insert comprising three or more upheaved portions having a height of 0.01 to 0.1 mm on at least one rake surface of the insert. The cutting insert can be stably secured by the support effect of the upheaved portions. In addition, stress concentration due to cutting impact does not occur and generation of breakage is reduced greatly, whereby even the cutting chip warped by case-hardening can be used for cutting without grinding.

18 Claims, 5 Drawing Sheets

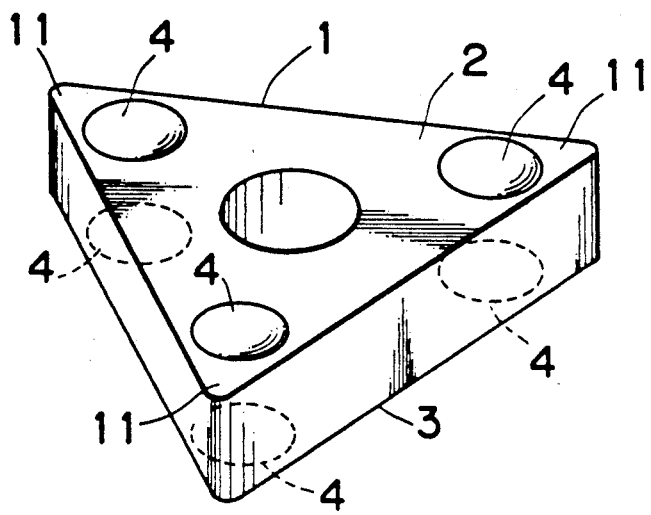
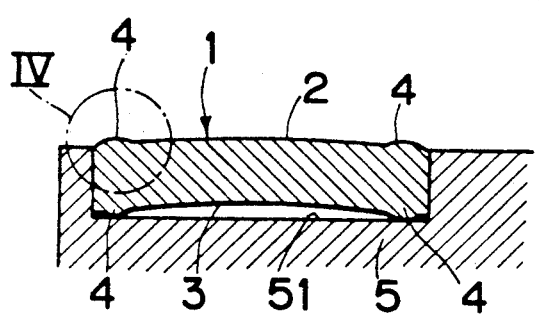
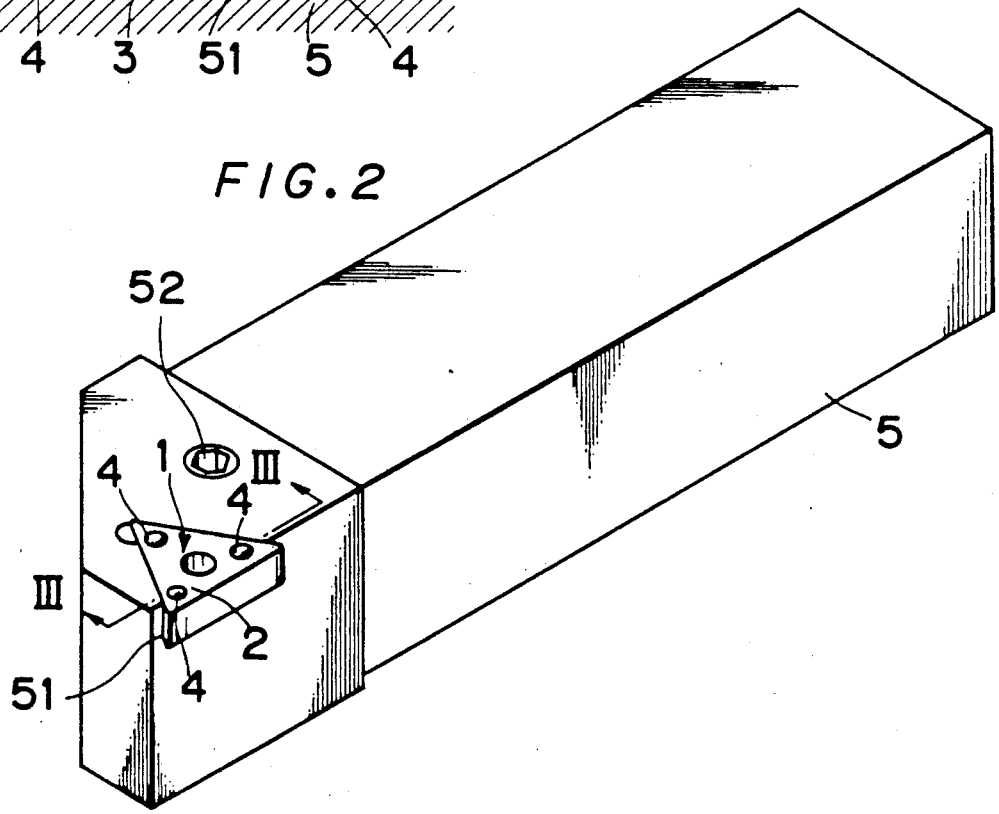

CUTTING INSERT

This is a continuation of application Ser. No. 262,601 filed on Oct. 26, 1988, abandoned.

BACKGROUND OF THE INVENTION

1. Field of the Invention

The present invention relates to an improvement in a throwaway cutting insert used to cut workpieces made of cast iron and similar materials.

2. Prior Art

A throwaway cutting insert having the shape of a polygonal plate, is generally secured on an insert support of a holder. The cutting edge of the cutting insert cuts the surface of a workpiece made of cast iron, steel, etc. to the desired shape, as the workpiece is rotated. When cutting a workpiece made of steel, a chip produced in the shape of a wire or rod during cutting may damage the workpiece surface and injure the hands of the operator. To solve this problem, the so-called breaker is provided near the edge of the cutting insert so that such a continuous chip is minutely broken or wound in the form of a spring when the chip is produced. When cutting a workpiece made of cast iron, however, such a chip is broken into pieces at moment the chip is produced. This can be explained by the characteristic of cast iron. Therefore, it is not necessary to provide such a breaker when cutting a workpiece made of cast iron. Furthermore, a cutting insert with no breaker is superior in the strength of the edge. Because of these reasons, a cutting insert with no breaker is used preferably to cut workpieces made of cast iron. Such a cutting insert is generally made of cermet or cemented carbide. A coating insert is also used. A cutting insert with no breaker is generally case-hardened. The case-hardened cutting insert may often warp as shown in FIG. 9 during case hardening. If a warped cutting insert c is secured on a holder, the cutting insert makes contact with the supporting surface $h_1$ of the holder h at the very small contact areas of the edge portions $c_1$. Stress concentration occurs and the edge portions may be broken. If the cutting insert c is installed upside down as shown FIG. 9 (b), the cutting insert cannot stably make contact with the supporting surface $h_1$ and may be broken due to impact during cutting. To solve these problems, only the rake surfaces $c_2$ are made flat by grinding because these surfaces make contact with the supporting surface $h_1$ when the cutting insert is installed as shown in FIGS. 9 (a) and 9 (b). More specifically, the portions shaded in FIG. 9 (c) are ground to obtain flat surfaces. However, this grinding increases the cost of the cutting insert and improvements in the cutting insert are thus desired.

SUMMARY OF THE INVENTION

Accordingly, it is an object of the present invention to provide a novel cutting insert which is not broken and does not require grinding even if the cutting insert is case-hardened.

The structure of the present invention is explained below referring to the accompanying drawings.

BRIEF DESCRIPTION OF THE DRAWINGS

FIG. 1 is a perspective view illustrating an embodiment of the present invention, FIG. 2 is a perspective view illustrating the embodiment being supported by an insert on a holder, FIG. 3 is a sectional view taken on line III—III of FIG. 2.

DETAILED DESCRIPTION OF THE INVENTION

The present invention relates to a plate-like cutting insert 1 equipped with three or more upheaved portions 4 having a height of 0.01 to 0.1 mm on at least one rake surface 2 or 3 of the insert 1.

The cutting insert 1 has a known plate-like shape similar to a triangle or square. The corners of the cutting insert 1 form edges 11.

Figure 4:
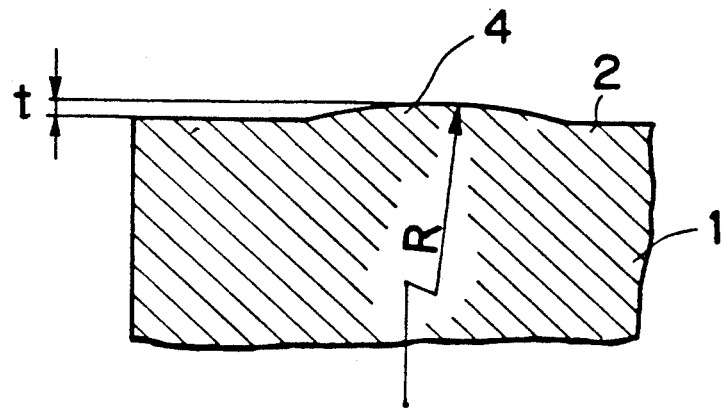
FIG. 4 is an enlarged view illustrating the encircled section IV of FIG. 3.
Figure 10:
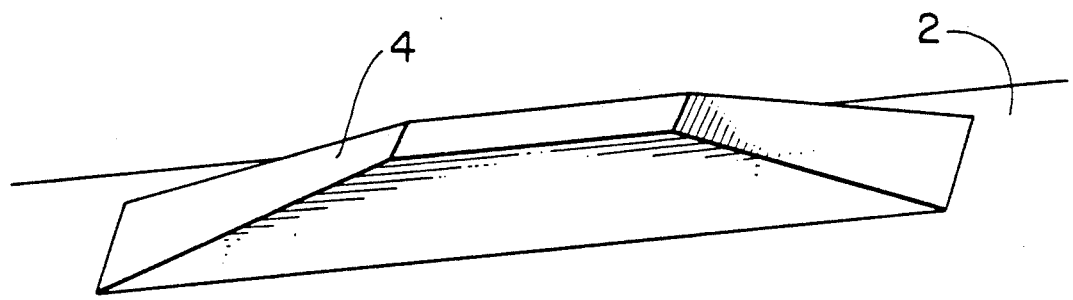
FIG. 10 is a perspective view illustrating an embodiment wherein the upheaved portion is shaped as a truncated pyramid.

At least three upheaved portions 4 may also be provided on both of the top and bottom rake surfaces 2 and 3. These upheaved portions 4 should preferably be gently-sloped and evenly-spaced, more specifically be formed in a spherical segment, truncated cone or truncated pyramid, and be disposed on the lines connecting the center of the cutting insert 1 and the edges 11 or at positions symmetrical in reference to the lines. They should also be disposed as close as possible to the fringes of the cutting insert 1, equally spaced from one another and equally distant from the center of the cutting insert 1 on the rake surface 2 (or 3). As mentioned above, the number of the upheaved portions 4 should be three or more. If the number is two or less, the cutting insert 1 cannot be installed stably. This makes it almost impossible to achieve the object of the present invention. The height t of the upheaved portion 4 on the rake surface 2 (or 3) must be between 0.01 and 0.1 mm. If the height is below 0.01 mm, the upheaved portion 4 may not make contact with the supporting surface but the fringes of the cutting insert 1 may make contact with the supporting surface if the cutting insert 1 is warped greatly. Thus, the upheaved portion cannot deliver its intended function. If the height exceeds 0.1 mm, the upheaved portion acts as an interference wall and increases cutting resistance. The shape of the upheaved portion should be a spherical segment (FIG. 4), truncated cone (FIG. 5) or truncated pyramid (FIG. 10). The slope from the top to the base of the upheaved portion must be gentle and smoothly connected to the flat rake surface 2 (or 3). No groove is allowed around the upheaved portion 4. If there is any groove, the effective height of the upheaved portion increases, and chips generated during cutting flow along the groove and collide with the distended portion 4. This may increase cutting resistance and reduce machinability.

The cutting insert 1 having the above-mentioned structure is installed the holder 5 as shown in FIG. 2 and used to cut workpieces made of cast iron and similar materials. More specifically, the rake surface 2 (or 3) with the upheaved portions 4 is made contact with the supporting surface 51 of the holder 1 and a securing means 52 is tightened using a known, conventional method to secure the cutting insert 1 on the supporting surface 51. Since the upheaved portions 4 are equally spaced from one another on the rake surface 2, only the upheaved portions 4 make contact with the supporting surface 51 as shown in FIG. 3 even if the cutting insert 1 is warped. Due to the support function of the upheaved portions 4, the cutting insert 1 is stably secured. Furthermore, since the upheaved portions 4 have a gentle, smooth shape, the effective contact areas are large. This prevents stress concentration at the upheaved portions 4, even if impact is applied during cutting. Therefore, it is not necessary to worry about breakage of the cutting insert 1 due to stress concentration and unstable installation.

EMBODIMENTS

The embodiments of the present invention are described below. The upheaved portions 4 shown in FIGS. 1 to 4 and FIGS. 6 to 8 have spherical surfaces. In this case, the radius of curvature of the surface should be between 5 and 100 mm, or preferably between 10 and 50 mm. If the radius is below 5 mm, the upheaved portions make point-like contact with the supporting surface 51, causing unstable installation. The slope of the upheaved portions 4 becomes sharp. As a result, cutting resistance increases and stress concentration is apt to occur at the upheaved portions 4. If the radius exceeds 100 mm, the basic diameter of the upheaved portions 4 becomes larger. If the upheaved portions 4 with such a larger base diameter are equally spaced on the rake surface 2 (or 3), the tops of the upheaved portions 4 are required to be positioned closer to the center of the cutting insert 1. As a result, the effective installation area corresponding to the area formed by connecting all tops of the upheaved portions becomes smaller and the cutting insert 1 cannot be secured stably.

Figure 6:
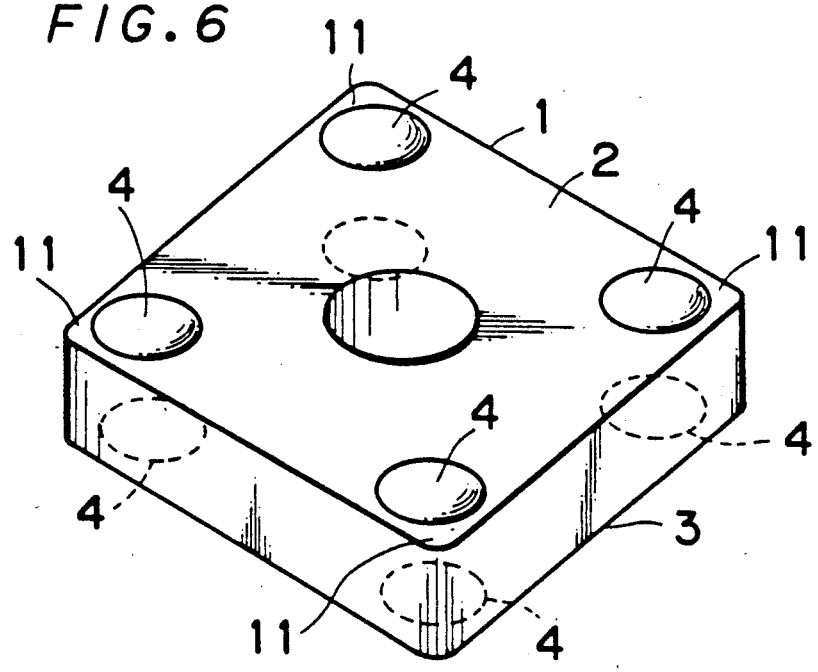
FIGS. 6, 7 and 8 are views similar to FIG. 1 illustrating other embodiments.

Referring to FIG. 1, the cutting insert 1 is a triangle plate. Six upheaved portions 4 having the above-mentioned spherical surfaces are disposed on the rake surfaces 2 and 3 (three on each surface). Each upheaved portion 4 is disposed close to each corresponding edge 11. The rake surfaces 2 and 3 are used as installation surfaces to be made contact with the holder 5. Both surfaces can be used interchangeably for installation. The edges 11 can also be used interchangeably. Therefore, the installation angle of the cutting insert 1 can be changed by rotating the cutting insert 1 or by turning it upside down depending on the breakage condition of each edge. Referring to FIG. 6, the cutting insert 1 is a parallelogram plate. The above-mentioned upheaved portions 4 are disposed on the rake surfaces 2 and 3. Each upheaved portion 4 is disposed close to the corresponding edge 11. This cutting insert 1 is similar to that shown in FIG. 1, although it has more interchangeable installation positions.

Figure 5:
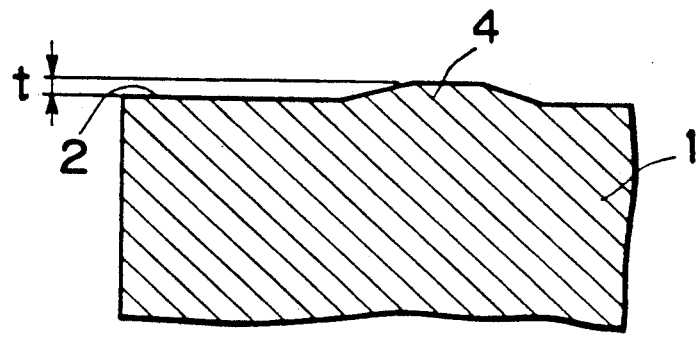
FIG. 5 is a view similar to FIG. 4 illustrating another embodiment.
Figure 7:
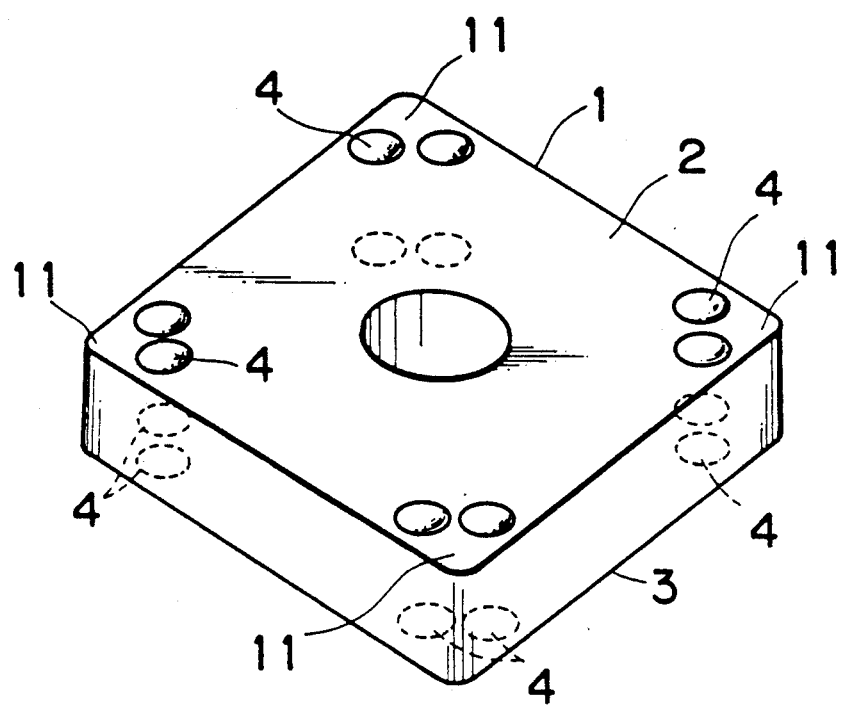
Figure 8:
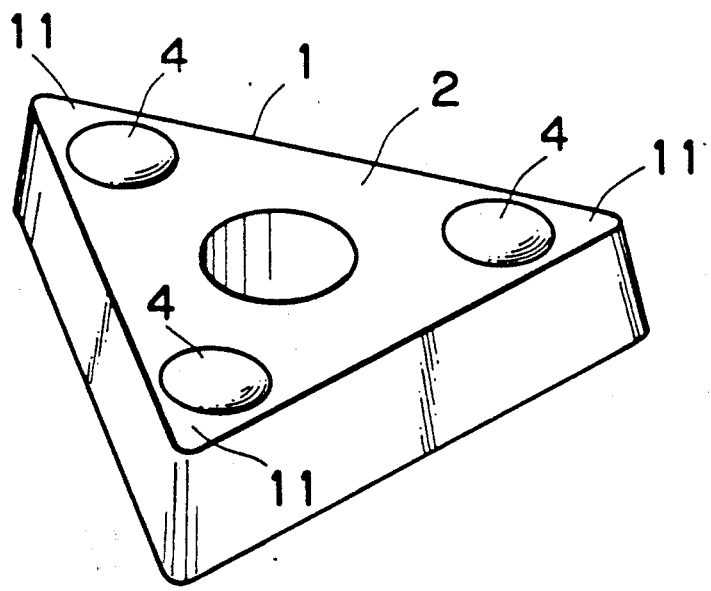
Figure 9A:
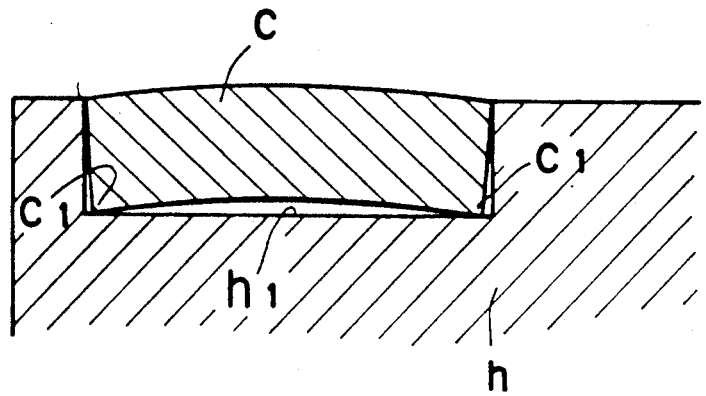
FIGS. 9 (a), 9 (b) and 9 (c) illustrate a conventional cutting insert.
Figure 9B:
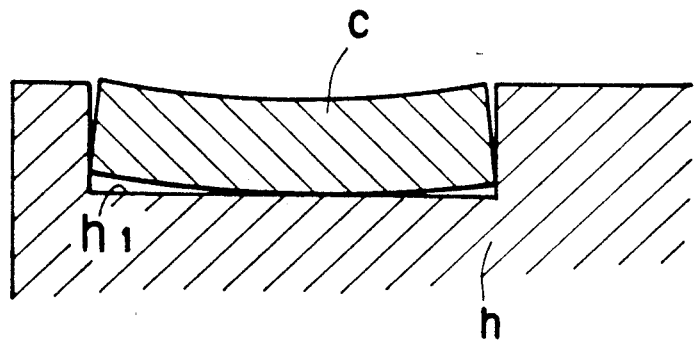
Figure 9C:
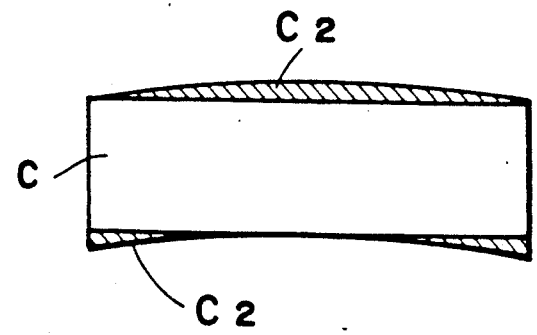

The cutting insert 1 shown in FIG. 7 is a parallelogram plate similar to that shown in FIG. 6 and has a pair of upheaved portions 4 disposed close to the corresponding edge 11. This cutting insert 1 has better installation stability than the above-mentioned cutting inserts, although there is no difference in function. The cutting insert 1 shown in FIG. 8 is a truncated triangular pyramid plate. The two surfaces of this type are not interchangeable. The truncated top surface 2 is to be used as a seat for the supporting surface. The upheaved portions 4 are formed only on the top surface 2. This cutting insert 1 is turned upside down and installed on the supporting surface 51 of the holder 5. The above-mentioned effect is obtained since the upheaved portions are made contact with the supporting surface 51. FIG. 5 shows another embodiment of the upheaved portion 4. The upheaved portion 4 is a so-called truncated cone (cone with a flat top surface). The height of the upheaved portion 4 should be in the above-mentioned height range as a matter of course. Furthermore, the shape of the truncated cone should be similar to the shape determined by the radius of curvature of the upheaved portion of the first embodiment. This upheaved portion having the shape of a truncated cone can be replaced with the above-mentioned upheaved portion having the spherical surface.

The upheaved portion 4 shown in FIG. 5 is exaggerated for easier understanding. As can be obviously understood by the value ranges of the height t and the radius of curvature R, both height and radius are very small and cannot be recognized easily with the naked eye. The warp of the cutting insert 1 is also very small and cannot be recognized easily.

As described above, the cutting insert of the present invention has three or more low and gently-sloped upheaved portions equally spaced on at least one of the two rake surfaces. When the rake surface having the upheaved portions is made contact with the supporting surface of the holder, the cutting insert can be stably secured by the support effect of the upheaved portions. In addition, stress concentration due to cutting impact does not occur and generation of breakage is reduced greatly. As a result, even a cutting insert warped by case-hardening can be used for cutting without grinding. Therefore, the above-mentioned cost increase can be prevented and the cutting insert of the present invention can be supplied at lower cost.

What is claimed is:

1. A cutting insert for a cutting tool holder having a supporting surface for supporting the insert, said insert comprising a first substantially flat rake surface which is adapted to face the supporting surface of said cutting tool holder and a second rake surface opposed to said first rake surface, wherein at least said first rake surface has at least one cutting edge and includes at least three upheaved portions for supporting said insert on said supporting surface, each having a maximum height between 0.01 and 0.1 mm relative to the first rake surface and a base width at least 19.9 times its height.

2. A cutting insert according to claim 1, wherein said upheaved portions are disposed evenly-spaced and gently-sloped.

3. A cutting insert according to claim 2, wherein said upheaved portions are disposed on the lines connecting the center of said cutting insert and the edges of said cutting insert, and equally spaced from the center of said cutting insert.

4. A cutting insert according to claim 1, wherein said upheaved portions are shaped as a spherical segment.

5. A cutting insert according to claim 4, wherein said spherical segment shaped upheaved portions have a radius of curvature ranging between 5 and 100 mm.

6. A cutting insert according to claim 4, wherein said spherical segment shaped upheaved portions have a radius of curvature ranging between 10 and 50 mm.

7. A cutting insert according to claim 1, wherein said cutting insert is a parallelogram plate.

8. A cutting insert according to claim 1, wherein said upheaved portions are shaped as a truncated cone.

9. A cutting tool comprising:
a holder having a supporting surface;

a case-hardened cutting insert including at least one substantially flat rake surface having at least one cutting edge and which is adapted to face the supporting surface of said holder; and at least three upheaved portions evenly-spaced apart on said rake surface, for supporting said insert on said supporting surface, each upheaved portion being gently-sloped and having a maximum height between 0.01 and 0.1 mm relative to the rake surface and a base width at least 19.9 times its height;

wherein said upheaved portions contact said supporting surface of said holder.

10. A cutting tool according to claim 9, wherein said upheaved portions are shaped as a spherical segment with a radius of curvature ranging between 5 and 100 mm.

11. A cutting tool according to claim 9, wherein said upheaved portions are shaped as a truncated cone.

12. A cutting tool according to claim 9, wherein said cutting insert is a parallelogram plate.

13. A cutting insert for a cutting tool holder having a supporting surface for supporting the insert comprising:

at least one substantially flat rake surface having at least one cutting edge and which is adapted to face the supporting surface of said cutting tool holder; and at least three upheaved portions evenly-spaced apart on said rake surface, for supporting said insert on said supporting surface, each upheaved portion being gently-sloped and having a maximum height between 0.01 and 0.1 mm relative to the rake surface and a base width at least 19.9 times its height;

said upheaved portions being shaped as a spherical segment with a radius of curvature ranging between 5 and 100 mm;

wherein said cutting insert is a parallelogram plate.

14. A cutting insert for a cutting tool holder having a supporting surface for supporting the insert comprising:

at least one substantially flat rake surface having at least one cutting edge and which is adapted to face the supporting surface of said cutting tool holder; and at least three upheaved portions evenly-spaced apart on said rake surface, for supporting said insert on said supporting surface, each upheaved portion being gently-sloped and having a maximum height between 0.01 and 0.1 mm relative to the rake surface and a base width at least 19.9 times its height, the shape of each upheaved portion being a truncated cone;

wherein said cutting insert is a parallelogram plate.

15. A plate shaped cutting insert for a cutting tool holder having a supporting surface for supporting the insert comprising:

at least one substantially flat rake surface having at least one cutting edge and which is adapted to face the supporting surface of said cutting tool holder; and at least three upheaved portions evenly-spaced apart on said rake surface, for supporting said insert on said supporting surface, each upheaved portion being gently-sloped and having a maximum height between 0.01 and 0.1 mm relative to the rake surface, the shape of each upheaved portion being a truncated pyramid;

16. A parallelogram plate cutting insert for a cutting tool holder having a supporting surface for supporting the insert comprising:

two substantially flat rake surfaces each having at least one cutting edge, disposed on opposite sides of said cutting insert; and eight gently-sloped upheaved portions on at least one rake surface which is adapted to face the supporting surface of said cutting tool holder, with two upheaved portions disposed adjacent each corner of said one rake surface in a symmetrical position on opposite sides of a line connecting the center of said rake surface and said corner, for supporting said insert on said supporting surface said upheaved portions having a maximum height between 0.01 and 0.1 mm relative to the one rake surface and a base width at least 19.9 times its height;

wherein said upheaved portions on said one rake surface contact the supporting surface of said cutting tool holder.

17. A cutting insert according to claim 16, wherein said upheaved portions are shaped as a spherical segment with a radius of curvature ranging between 5 and 100 mm.

18. A cutting insert according to claim 16, wherein said upheaved portions are shaped as a truncated cone.

* * * * *